Patented Nov. 19, 1935

2,021,726

UNITED STATES PATENT OFFICE 2,021,726

ARALKYL TRITHIOCARBONATES

Raymond W. Hess, Buffalo, N. Y., assignor to National Aniline & Chemical Co. Inc., New York, N. Y., a corporation of New York No Drawing. Application March 29, 1930, Serial No. 440,157

12 Claims. (Cl. 260—16)

This invention relates to the production of aralkyltrithiocarbonates (aralkyltrithiocarbonic acids and their derivatives), and specifically to benzyltrithiocarbonic acid and its homologues, salts, esters, anhydrides, sulfides, acyl and other derivatives.

An object of the invention is to provide derivatives of trithiocarbonic acid which may be readily and economically manufactured commercially and which may be utilized in various operations, as for example in organic synthesis.

Other objects of the invention will in part be obvious and will in part appear hereinafter.

In structure and composition, the new compounds comprehended by the present invention may be characterized as those containing the following dominant atomic groupings:

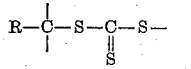

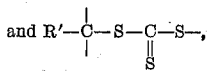

where R denotes an aryl radical, and R' denotes a hydrocarbon radical of the benzene series, and more particularly as those having the following probable general formulae:

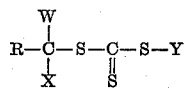

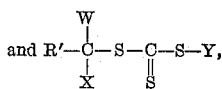

wherein R denotes an aryl radical, R' denotes an aryl radical of the benzene series, W and X each denote a hydrogen atom or an organic radical, e. g., a hydrocarbon radical, and Y denotes a hydrogen atom, a metal, or an organic radical, e. g., an alkyl, aralkyl, aryl, alkaryl, acyl, thioacyl, sulfonyl, another trithiocarbonate group or a trithiocarbonate sulfide group, etc.

The trithiocarbonic acids and their alkali-metal salts may be characterized by the probable general formula,

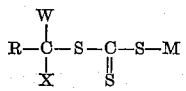

wherein R denotes an aryl radical, which radical may contain substituents in its nucleus, W and X each denote a hydrogen atom or an organic radical, and M denotes a hydrogen atom or an alkali-metal.

The invention accordingly comprises a composition of matter possessing the characteristics and properties which will be exemplified in the compositions hereinafter described. The scope of the invention will be indicated in the claims.

In the practice of the invention various processes may be followed in preparing the new compositions, and the following examples present illustrative embodiments of a manner in which they may be prepared. The parts are by weight.

The aralkyltrithiocarbonic acids, in the form of their alkali-metal salts, may be prepared by treating an alkali-metal salt of an aralkyl mercaptan with carbon disulfide as illustrated in the following example.

*Example 1.*—To a mixture consisting of 24.8 parts benzyl mercaptan and 18.2 parts carbon disulfide, there are slowly added, with stirring and cooling, 10.8 parts of sodium hydroxide solution (1 part=0.74 parts NaOH) and, simultaneously, 12 parts of carbon disulfide. After stirring for about one-half hour, and crushing any lumps which may be present, the mixture is allowed to evaporate to dryness at ordinary temperature in the air. The sodium salt of benzyltrithiocarbonic acid, having the probable formula,

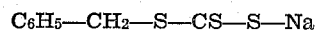

$C_6H_5$—$CH_2$—S—CS—S—Na is obtained in the form of yellow crystals. It is soluble in water and in alcohol; practically insoluble in acetone and carbon disulfide; and may be purified by recrystallization from alcohol, if desired.

In a similar manner, other aralkyltrithiocarbonic acids in the form of their alkali metal salts may be prepared by using in place of benzyl mercaptan other aralkyl mercaptans, e. g., xylyl mercaptan, $CH_3$—$C_6H_4$—$CH_2$—SH, phenylmethyl thiocarbinol, $C_6H_5$—CH($CH_3$)—SH, triphenyl thiocarbinol, ($C_6H_5$)$_3$C—SH, etc.

The free aralkyltrithiocarbonic acid may be obtained by treating a metal salt of the acid with an inorganic acid, e. g., with dilute hydrochloric or sulfuric acid, as illustrated in the following example.

*Example 2.*—10 parts of the sodium salt of benzyltrithiocarbonic acid are dissolved in about 20 to 25 parts of water and to the resulting solution at a temperature of about 5 to 10° C. dilute hydrochloric acid is added until the solution reacts acid to Congo red test paper. The free acid having the probable formula $$C_6H_5-CH_2-S-CS-SH$$

separates in the form of an oil, which, upon removal and addition to a small amount of water and cooling to about 2° C., solidifies. Upon heating the mixture containing the solidified oil to about 5° to 7° C., the oil again liquefies. The oil is insoluble in water but readily soluble in a sodium carbonate solution.

Other aralkyltrithiocarbonic acids can be prepared in a similar manner by treating their salts with dilute acids.

The aralkyltrithiocarbonic disulfides may be prepared by treating the salts of the aralkyltrithiocarbonic acids, particularly the alkali metal salts with a halogen, preferably with iodine as illustrated in the following example.

*Example 3.*—To a solution of 9.4 parts of the sodium salt of benzyltrithiocarbonic acid in 100 cc. of water, there is added a slight excess of an aqueous solution of iodine in potassium iodide. The excess iodine is removed by the addition of an aqueous solution of sodium thiosulfate. The benzyltrithiocarbonic disulfide precipitates as an oil which solidifies to a yellow colored solid. Upon recrystallization from alcohol, the disulfide separates in bright yellow crystals which has a melting-point of about 86°–88° C. The disulfide is insoluble in water but is soluble in alcohol, carbon disulfide, chloroform, benzene and other organic solvents. It has the following probable formula:

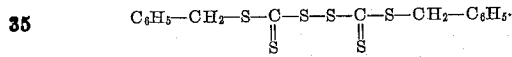

Other aralkyltrithiocarbonic disulfides may be prepared in a similar manner from the salts of other aralkyltrithiocarbonic acids.

The esters of the aralkyltrithiocarbonic acids which may be represented by the following probable formula:

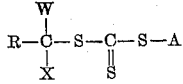

wherein R denotes an aryl radical, which radical may contain substituents in its nucleous, W and X each denote a hydrogen atom or an organic radical, and A denotes a substituted or unsubstituted hydrocarbon radical, may be prepared by treating their salts, e. g., their alkali metal salts, with a halogen-substituted hydrocarbon or a derivative thereof, as illustrated in the following example:

*Example 4.*—To a well-stirred solution of 22.2 parts of sodium benzyltrithiocarbonate in 39.2 parts of alcohol at room temperature, there are added 12.6 parts of benzyl chloride, and the mixture is allowed to stand for 12 to 24 hours, or until the reaction is completed. The reaction-mixture is then diluted with water, and the precipitated oily product is separated and washed with water. If desired, the product may be dried in contact with anhydrous sodium sulfate. The resulting oil upon cooling solidifies to form yellow crystals which have a melting-point of about 13° to 15° C. It is insoluble in water, slightly soluble in alcohol, readily soluble in carbon disulfide, ether, and benzene; and has the following probable formula:

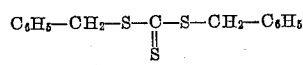

In a similar manner, other organic halides and the salts of other aralkyltrithiocarbonic acids may be employed in the preparation of their corresponding esters.

Further, other halides than ester-forming halides may be employed, for instance, acyl halides, e. g., acetyl chloride, benzoyl chloride, carbonyl chloride, thiocarbonyl chloride, benzene sulfonyl chloride, sulfur mono- or dichloride, etc. Examples of products produced by the employment of this type of compounds or reagents may be represented by the following formulae:

$$C_6H_5-CH_2-S-CS-S-OC-CH_3,$$

$$(C_6H_5-CH(CH_3)-S-CS-S)_2CZ \ (Z=O \text{ or } S)$$

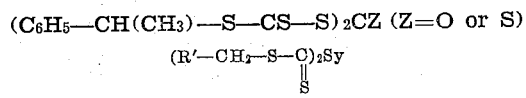

wherein R' is a hydrocarbon radical of the benzene series, and $y$ is an integer greater than 1, more particularly $$(CH_3-C_6H_4-CH_2-S-CS-S)_2S_x$$

wherein $x$ is 1 or more, $$C_6H_5-CH_2-S-CS-S-SO_2-C_6H_5$$

Collectively and individually, these new compounds constitute a class which is regarded as of value when utilized as accelerators in the vulcanization of rubber, as flotation agents in the concentration of ores, and as intermediates in organic synthesis.

As hereinabove pointed out the new compounds of the present invention contain as the characteristics radical the aralkyl trithiocarbonate radical and hence in the appended claims are referred to as "aralykyl triothiocarbonates", which term, it will be understood, includes the free acids.

Since certain changes may be made in the above composition of matter and in their manner of preparation, and different embodiments of the invention could be made without departing from its scope, it is intended that all matter contained in the above description shall be interpreted as illustrative and not in a limiting sense.

I claim:

1. An aralkyl trithiocarbonate composed of a radical of the benzene series linked to the thiocarbonate radical by a carbon atom which in turn is linked to two members selected from the group consisting of hydrogen and radicals of the methane and the benzene series which may be the same or different.

2. A benzyl trithiocarbonate.

3. An aralkyl derivative of trithiocarbonic acid having the constitution corresponding with the general formula

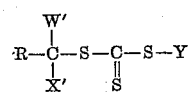

wherein R denotes an aryl radical of the benzene series, W' and X' each denote hydrogen or a hydrocarbon radical included in the methane and the benzene series, and Y denotes an organic radical, and wherein the dominant atomic grouping is:

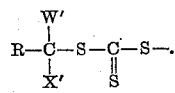

4. An aralkyl derivative of trithiocarbonic acid having the constitution corresponding with the general formula:

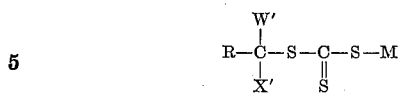

wherein R denotes an aryl radical of the benzene series, W' and X' each denote hydrogen or a hydrocarbon radical including in the methane and the benzene series, and M denotes a hydrogen atom or an alkali-metal.

5. A benzyl derivative of trithiocarbonic acid having the constitution corresponding with the general formula:

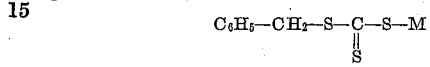

wherein M denotes a hydrogen atom or an alkali-metal.

6. Dibenzyl trithiocarbonate, having the formula:

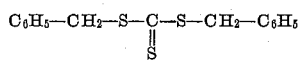

and being a yellow solid melting at about 13° to 15° C., insoluble in water, slightly soluble in alcohol, and readily soluble in carbon disulfide, ether and benzene.

7. An aralkyl derivative of trithiocarbonic acid having the constitution corresponding with the general formula:

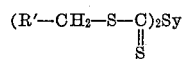

wherein R' is a hydrocarbon radical of the benzene series, and $y$ is 2, 3 or 4.

8. Benzyl trithiocarbonic disulfide, having the formula:

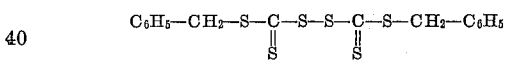

and being a bright yellow solid having a melting point of 86° to 88° C., insoluble in water, and soluble in alcohol, carbon disulfide, chloroform and benzene.

9. A benzyl trithiocarbonate wherein the carbon atom of the methylene group of the benzyl radical is linked to two members selected from the group consisting of hydrogen, the methyl radical and a phenyl radical, which may be the same or different.

10. An aralkyl derivative of trithiocarbonic acid having the constitution corresponding with the general formula:

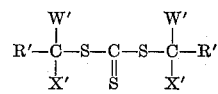

wherein each R' denotes a hydrocarbon radical of the benzene series and W' and X' each denote hydrogen or a hydrocarbon radical included in the methane and the benzene series.

11. An aralkyl derivative of trithiocarbonic acid having the constitution corresponding with the general formula:

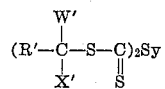

wherein R' denotes a hydrocarbon radical of the benzene series, W' and X' each denote hydrogen or a hydrocarbon radical included in the methane and the benzene series, and $y$ denotes 2, 3 or 4.

12. An aralkyl derivative of trithiocarbonic acid having the constitution corresponding with the general formula:

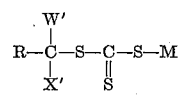

wherein R denotes an aryl radical of the benzene series, W' and X' each denote hydrogen or a hydrocarbon radical included in the methane and the benzene series, and M denotes an alkali metal.

RAYMOND W. HESS.

CERTIFICATE OF CORRECTION.

Patent No. 2,021,726.  November 19, 1935.

RAYMOND W. HESS.

It is hereby certified that error appears in the printed specification of the above numbered patent requiring correction as follows: Page 3, first column, line 9, claim 4, for including" read included; and that the said Letters Patent should be read with this correction therein that the same may conform to the record of the case in the Patent Office.

Signed and sealed this 7th day of Januuary, A. D. 1936.

Leslie Frazer
Acting Commissioner of Patents.

(Seal)